(12) United States Patent
Macadams et al.

(10) Patent No.: US 11,192,351 B2
(45) Date of Patent: Dec. 7, 2021

(54) PEEL PLY FOR SURFACE PREPARATION AND BONDING METHOD USING THE SAME

(71) Applicant: CYTEC INDUSTRIES INC., Princeton, NJ (US)

(72) Inventors: Leonard Macadams, Woolwich Township, NJ (US); Dalip K. Kohli, Churchville, MD (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 392 days.

(21) Appl. No.: 16/347,239

(22) PCT Filed: Dec. 19, 2018

(86) PCT No.: PCT/US2018/066486
§ 371 (c)(1),
(2) Date: May 3, 2019

(87) PCT Pub. No.: WO2019/126314
PCT Pub. Date: Jun. 27, 2019

(65) Prior Publication Data
US 2021/0283891 A1    Sep. 16, 2021

Related U.S. Application Data

(60) Provisional application No. 62/608,850, filed on Dec. 21, 2017.

(51) Int. Cl.
*B32B 5/00* (2006.01)
*B32B 7/00* (2019.01)
(Continued)

(52) U.S. Cl.
CPC .............. *B32B 37/02* (2013.01); *B29C 65/48* (2013.01); *B29C 65/483* (2013.01); *B32B 5/022* (2013.01);
(Continued)

(58) Field of Classification Search
CPC .. B32B 5/00; B32B 5/02; B32B 5/022; B32B 5/024; B32B 5/026; B32B 7/00;
(Continued)

(56) References Cited

U.S. PATENT DOCUMENTS 6,645,610 B1 * 11/2003 Reis ................... B29C 70/24
428/297.4

FOREIGN PATENT DOCUMENTS

EP    1967354 A1    9/2008
EP    2921290 A1    9/2015

* cited by examiner

Primary Examiner — Jacob T Minskey
Assistant Examiner — Matthew Hoover
(74) Attorney, Agent, or Firm — Thi Dang

(57) ABSTRACT

A method for surface preparation of a composite substrate prior to adhesive bonding. The surface preparation method includes applying a resin-containing peel ply onto a composite substrate, followed by co-curing. The resin-containing peel ply contains a non-removable textile carrier and a removable woven fabric embedded therein. After co-curing, the peel ply is removed from the composite substrate such that the removable woven fabric is removed but the non-removable textile carrier and a film of residual resin remain on the composite substrate, thereby creating a modified, bondable surface on the composite substrate. The composite substrate with the modified surface can be bonded to another composite substrate, whereby the textile carrier remains an integrated part of the final bonded structure.

14 Claims, 3 Drawing Sheets

(51) Int. Cl.
  *B32B 27/00*    (2006.01)
  *B32B 37/00*    (2006.01)
  *B29C 65/00*    (2006.01)
  *B32B 37/02*    (2006.01)
  *B32B 5/02*    (2006.01)
  *B32B 7/06*    (2019.01)
  *B32B 27/38*    (2006.01)
  *B32B 27/12*    (2006.01)
  *B29C 65/48*    (2006.01)
  *B32B 37/12*    (2006.01)

(52) U.S. Cl.
  CPC .............. *B32B 5/024* (2013.01); *B32B 5/026* (2013.01); *B32B 7/06* (2013.01); *B32B 27/12* (2013.01); *B32B 27/38* (2013.01); *B32B 37/12* (2013.01); *B32B 2037/1253* (2013.01); *B32B 2262/0276* (2013.01); *B32B 2264/10* (2013.01); *B32B 2307/718* (2013.01); *B32B 2307/732* (2013.01)

(58) Field of Classification Search
  CPC ........... B32B 7/06; B32B 27/00; B32B 27/10; B32B 27/12; B32B 27/30; B32B 27/38; B32B 37/00; B32B 37/02; B32B 37/10; B32B 37/12; B29C 65/00; B29C 65/40; B29C 65/48; B29C 65/483
  See application file for complete search history.

PEEL PLY FOR SURFACE PREPARATION AND BONDING METHOD USING THE SAME

CROSS-REFERENCE TO RELATED APPLICATIONS

The present application is a U.S. national phase entry under 35 U.S.C. § 371 of International Application No. PCT/US2018/066486, filed on 19 Dec. 2018, which claims priority to U.S. provisional Application No. 62/608,850, filed on 21 Dec. 2017, the entire content of each of these applications is explicitly incorporated herein by reference.

DETAILED DESCRIPTION

Figure 1:
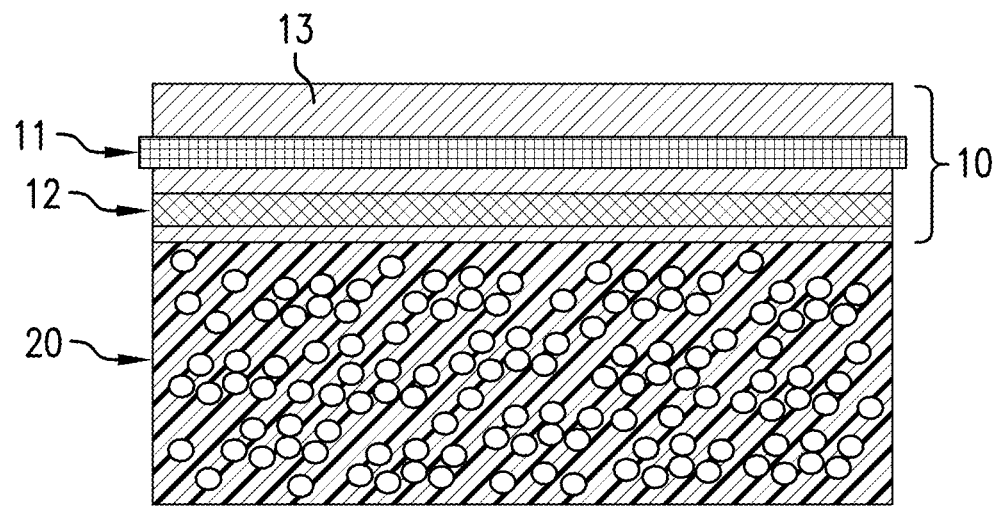
FIG. 1 illustrates a composite substrate having a peel ply applied thereon, according to one embodiment of the present disclosure.

Adhesive bonding of metallic and non-metallic substrates is a known method that is applied in a variety of industries, including transportation, energy, automotive, and aerospace. Epoxy-based adhesives are widely used to form permanent bonds between substrates, especially in the aerospace sector, due to the ability of the adhesive to minimize stress concentrations, reduce structural weight, decrease assembly time, reduce cost, and improve corrosion resistance. Adhesive bonding is carried out, generally, by one of three ways: (1) co-curing, (2) co-bonding, and (3) secondary bonding.

"Co-curing" involves joining uncured composite parts by simultaneously curing and bonding, wherein the composite parts are being cured together with the adhesive, resulting in chemical bonding. However, it is difficult to apply this technique to the bonding of uncured prepregs to fabricate large structural parts with complex shapes. Uncured composite materials, e.g. prepregs, are tacky (i.e. sticky to the touch) and lack the rigidity necessary to be self-supporting. As such, uncured composite materials are difficult to handle. For example, it is difficult to assemble and bond uncured composite materials on tools with complex three-dimensional shapes.

"Co-bonding" involves joining a pre-cured composite part to an uncured composite part by adhesive bonding, wherein the adhesive and the uncured composite part are being cured during bonding. The pre-cured composite usually requires an additional surface preparation step prior to adhesive bonding.

"Secondary bonding" is the joining together of pre-cured composite parts by adhesive bonding, wherein only the adhesive is being cured. This bonding method typically requires surface preparation of each previously cured composite part at the bonding surfaces.

In aerospace industry, composite structures are typically co-bonded or secondary bonded, and the surface treatment of pre-cured parts is usually required prior to joining. Such surface treatments may include grit blasting, sanding, peel ply application, priming, plasma treatment, laser ablation, and other methods known in the art. Both co-bonding and secondary bonding require surface preparation of each previously cured composite part to achieve the highest level of bond line integrity in the adhesively bonded structures. The "bond line" refers to the adhesive joint between the bonded structures. Such surface treatments enhance adhesion by creating micro-roughness at the surface. The roughened surface allows for better adhesion through mechanical interlocking at the bonding surface.

While traditional surface preparation methods can provide enhanced adhesion and eliminate adhesive failure in the bonded composite structures, they do not impart additional strength to the bonded structure. Thus, the ultimate bond strength is derived almost entirely from the adhesive when cohesive failure is the dominant failure mode. Moreover, in certain conditions, such as upon exposure to low temperature, e.g., below 75° F. (or <24° C.), the fracture toughness of the bonded structures can be greatly diminished when conventional surface preparations are used.

Disclosed herein is an a bonding method that can provide a high bonding strength and a high fracture toughness, as well as overcoming the limitations of mechanical performance degradation at low temperature discussed above.

The bonding method of the present disclosure includes the application of a resin-containing peel ply on a composite substrate for surface preparation prior to adhesive bonding. The resin-containing peel ply is composed of a layer of curable resin in which a removable fabric and a non-removable textile (referred herein as "carrier") are embedded. The term "embedded" as used in this context means being fixed in a surrounding mass. When the resin-containing peel ply is applied to a composite substrate, the non-removable fabric is located between the removable fabric and the composite substrate. That is, the non-removable carrier is closer to the composite substrate than the removable fabric. The peel ply is designed such that it can be co-cured with the composite substrate (e.g., prepreg layup). After co-curing, the removable fabric is peeled off together with some of the peel ply resin, leaving behind the non-removable carrier, which is embedded in a thin film of remaining peel ply resin, on the fully cured composite substrate. After peel ply removal, a roughened bondable surface is revealed. The cured composite substrate can be bonded to another substrate through an adhesive. After adhesive bonding, the non-removable carrier becomes a permanent part of the bonded structure.

The bonding method as disclosed herein can produce enhanced bond strength beyond what the adhesive alone could provide. Performance benefits derived from the bonding method of the present disclosure can be seen at low temperatures. It is well known that bonded composite structures subjected to low temperatures, such at –67° F., become brittle and stiff as their elastic modulus is increased. Thus, the composite resistance to crack propagation decreases along with a concomitant decrease in strength and toughness. As a result, for example, $G_1$ fracture toughness values decrease from a starting point of 5-7 in-lb/in$^2$ (875-1225 J/m$^2$) to approximately 2-3 in-lb/in$^2$ (350-525 J/m$^2$). For many applications of composite materials, exposure to low temperatures are unavoidable, thus, it is desirable to improve the low temperature properties of composites such at $G_{1c}$.

It is believed that the incorporation of the non-removable textile carrier at the adhesive bond line resulted in additional bond strength and fracture toughness by minimizing crack propagation out of the adhesive bond line, and incorporating the textile fibers into the fracture. The additional strength and toughness are achieved because additional energy is required to break fiber bundles as fracture propagates through the textile carrier.

Figure 2:
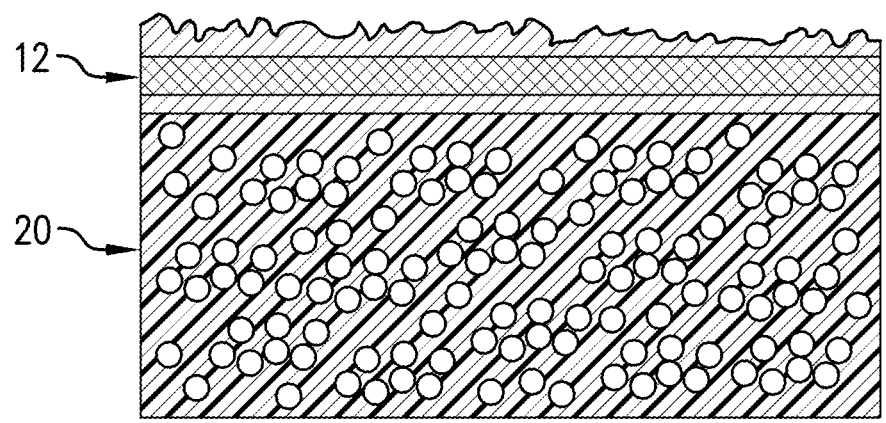
FIG. 2 shows the composite substrate of FIG. 1 after peel ply removal.

FIGS. 1 and 2 illustrate how the resin-containing peel ply of the present disclosure is used to create a bondable surface. Referring to FIG. 1, a curable peel ply 10 is first laminated onto an outermost surface of an uncured or curable composite substrate 20. The curable peel ply 10 is composed of a removable woven fabric 11 and a non-removable carrier 12, which are embedded in a curable matrix resin 13. The uncured/curable composite substrate 20 is composed of reinforcement fibers infused or impregnated with an uncured or curable matrix resin, which is different in composition from that of the peel ply matrix resin 13.

Next, co-curing of the peel ply 10 and the composite substrate 20 is carried out by heating at elevated temperature(s) for a pre-determined time period until the composite substrate is fully cured. The peel ply resin 13 can be formulated so that the peel ply resin is fully cured or only partially cured when the composite substrate 20 is fully cured under the same curing conditions. As a result of co-curing, the peel ply resin intermingles and reacts with the composite matrix resin. The rheology and cure kinetics of the peel ply matrix resin are controlled to obtain the desired amount of intermingling between the peel ply matrix resin and the matrix resin of the composite substrate to maximize the co-curing of the resins, thereby ensuring that a sufficient amount of peel ply resin remains on the surface following co-curing.

After co-curing, the removable fabric 11 is peeled off to yield a rough, bondable surface as shown in FIG. 2. The non-removable carrier 12 and a residual thin layer of peel ply resin remain on the composite substrate 20 following the removal of fabric 11. More specifically, the non-removable carrier 12 is embedded in the film of residual resin. The remaining film of residual resin with the embedded carrier may have a thickness of about 50% to about 25% of the original thickness of the peel ply prior to removal. The residual resin film and the embedded non-removable carrier 12 create a modified, bondable surface.

Co-curing of the peel ply 10 and composite substrate 11 may be carried out at a temperature ranging from room temperature to 375° F. (191° C.) for 1 hr to 12 hr at pressures ranging from 0 psi-80 psi (0 MPa-0.55 MPa). Moreover, co-curing may be achieved in an autoclave or by an out-of-autoclave process in which no external pressure is applied.

Figure 3:
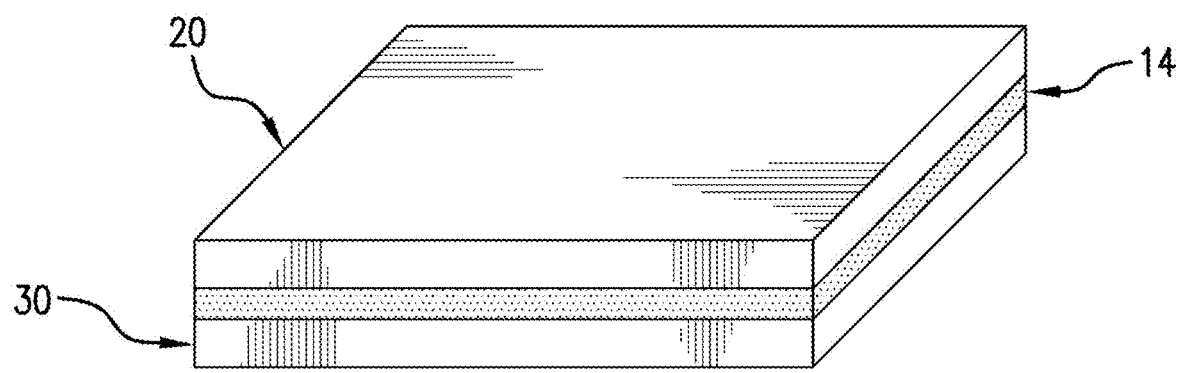
FIG. 3 illustrates two substrates being bonded together by an adhesive film.

As shown in FIG. 3, the cured composite substrate 20 with the pre-treated, bondable surface (from FIG. 2) may be joined to another composite substrate 30 through a curable adhesive film 14, which is sandwiched in between the substrates. The second composite substrate 30 may be a cured composite substrate that has been subjected to the same peel ply surface preparation as described for composite substrate 20 so as to form a counterpart bondable surface. The joined composite substrates 20 and 30 are then subjected to heat treatment at elevated temperature(s) to cure the adhesive, resulting in a bonded structure—this is referred to as secondary bonding.

Alternatively, the bondable surface of the second composite substrate 30 may be prepared by other known surface treatments including, but not limited to sand blasting, grit blasting, dry peel ply surface preparation, etc. "Dry peel ply" is a dry, woven fabric (without resin), usually made out of nylon, glass, or polyester, which is applied to the bonding surface of the composite substrate followed by curing. After curing, the dry peel ply is removed to reveal a textured bonding surface.

In another embodiment, the composite substrate 30 is in an uncured state when it is joined to the cured composite substrate 20. In such case, the uncured composite substrate 30 and the curable adhesive film 14 are cured simultaneously in a subsequent heating step—this is referred to as co-bonding.

During co-bonding or secondary bonding of the composite substrates 20 and 30 according to methods disclosed herein, the non-removable carrier is integrated into the final bonded structure and thus, fuses together with the resin of the adhesive film 14. As a result, when a load is applied to the adhesive joint, the carrier is able to absorb energy and increase the bond strength between bonded substrates. For example, when a crack is propagating through the adhesive bond line, the carrier is able to provide additional strength because energy is required to break the fibers in the carrier in order for the crack to continue migrating through the bonded structure.

Peel Ply

The resin-containing peel ply of the present disclosure has a resin content of at least 20% by weight based on the total weight of the peel ply, depending on the specific type of fabrics being impregnated. In certain embodiments, the resin content is within the range of 20%-80% or 20%-50% by weight.

The removable fabric in the peel ply is a woven fabric composed of a plurality of yarns woven in a weaving pattern. Each yarn is composed of a plurality of continuous fibrous filaments (or single fibers) twisted together. The woven fabric may have a fabric weight within the range of 50 gsm (g/m$^2$) to 250 gsm, preferably, 70 gsm to 220 gsm, and a thickness within the range of 50 μm to 250 μm, preferably 100 μm to 200 μm. The yarns of the woven fabric may be formed from various synthetic materials including, but are not limited to, polyesters (polyethylene terephthalate, polybutylene terephthalate, polytrimethylene terephthalate, polylactic acid, and copolymers thereof), polyethylene, polypropylene, polyamide (nylon), elastomeric materials such as LYCRA® and high-performance fibers such as the polyaramids (e.g. Kevlar), polyimides, polyethyleneimine (PEI), polyoxazole (e.g. Zylon polybenzimidazole (PBI), polyether ether ketone (PEEK), and glass. The woven fabric may additionally have a heat set finish or other conventional finish as required. Additionally, the weaving pattern is not limited and may be plain weave, twill weave, basket weave, satin weave, and the like.

Figure 4:
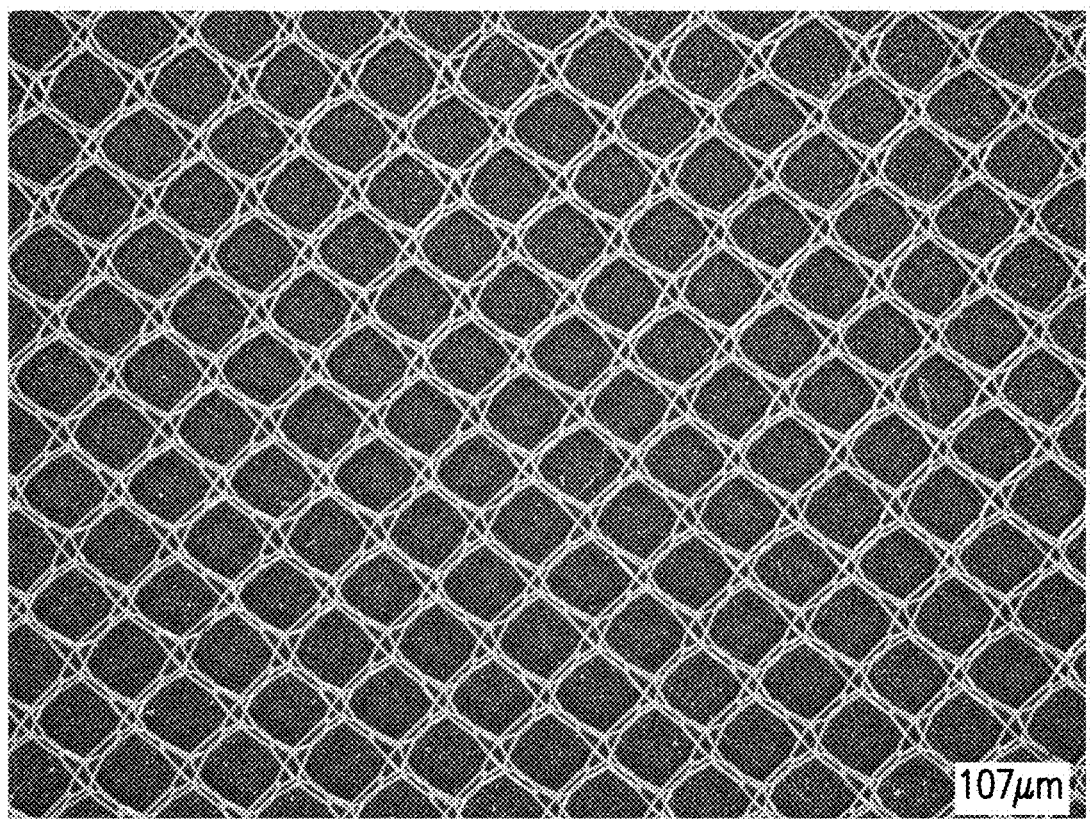
FIG. 4 is a top view image of a carrier fabric having a tricot warp knit mesh pattern that can be incorporated into the peel ply.

The non-removable carrier is a textile selected from woven and knitted fabrics, and nonwoven mat or veil of randomly arranged fibers. The non-removable carrier is preferably light-weight and generally constitutes less than 20% by weight of the peel ply layer. The carrier may have an areal weight within the range of 5 gsm to 100 gsm, in some embodiments, 5 gsm to 25 gsm. The carrier may have a thickness within the range of 10 μm to 250 μm, in some embodiments, 125 μm to 175 μm. The fibers of the carrier fabric/veil may have fiber diameter in the range of 40 μm-50 μm. The light-weight nature of such fabric/veil does not allow for complete infusion of the resin into the fiber bundles resulting in a high concentration of peel ply resin at the surface that is available for adhesive bonding. The woven or knit pattern of the non-removable carrier is preferably an open mesh knit pattern (see-through mesh-fabric) through which fluids can easily flow. In one embodiment, the non-removable carrier fabric has a tricot warp knit mesh pattern such as that shown in FIG. 4. The fiber composition for the carrier fabric may be selected from the same synthetic materials listed above for the removable woven fabric. In one embodiment, the non-removable carrier is a knitted fabric composed of polyamide (nylon) or polyester fibers.

Knitted fabric is a textile that results from knitting. Its properties are distinct from woven fabric in that it is more flexible. Knitting is a technique for producing a two-dimensional fabric made from a one-dimensional yarn or thread. In weaving, threads are always straight, running parallel either lengthwise (warp threads) or crosswise (weft threads). By contrast, the yarn in knitted fabrics follows a meandering path (a course), forming symmetric loops symmetrically above and below the mean path of the yarn. These meandering loops can be easily stretched in different directions giving the knitted fabrics much more elasticity than woven fabrics.

The matrix resin of the peel ply is formed from a curable resin composition which includes at least one thermoset resin, a curing agent, and optional additives such as fillers and modifiers.

Suitable thermoset resins include, but are not limited to, epoxy resins, phenolics, phenols, cyanate esters, bismaleimides, benzoxazines, polybenzoxazines, polybenzoxazones, combinations thereof and precursors thereof.

Particularly suitable are multifunctional epoxy resins (or polyepoxides) having a plurality of epoxy groups per molecule. The polyepoxides may be saturated, unsaturated, cyclic, or acyclic, aliphatic, aromatic, or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)methane), fluorine 4,4'-dihydroxy benzophenone, bisphenol Z (4,4'-cyclohexylidenebisphenol) and 1,5-hyroxynaphthalene. Other suitable polyphenols as the basis for the polyglycidyl ethers are the known condensation products of phenol and formaldehyde or acetaldehyde of the novolac resin-type.

Examples of suitable epoxy resins include diglycidyl ethers of bisphenol A or bisphenol F, e.g. EPON™ 828 (liquid epoxy resin), D.E.R. 331, D.E.R. 661 (solid epoxy resinS) supplied by Dow Chemical Co.; triglycidyl ethers of aminophenol, e.g. ARALDITE® MY 0510, MY 0500, MY 0600, MY 0610 from Huntsman Advanced Materials. Additional examples include phenol-based novolac epoxy resins, commercially available as DEN 428, DEN 431, DEN 438, DEN 439, and DEN 485 from Dow Chemical Co; cresol-based novolac epoxy resins commercially available as ECN 1235, ECN 1273, and ECN 1299 from Ciba-Geigy Corp.; hydrocarbon novolac epoxy resins commercially available as TACTIX 71756, TACTIX 0556, and TACTIX 0756 from Huntsman Advanced Materials.

Suitable curing agents for the peel ply resin may include, but are not limited to, aliphatic and aromatic amines, boron trifluoride complexes, guanidines, dicyandiamide, bisureas (e.g. 2,4-Toluene bis-(dimethyl urea), 4,4'-Methylene bis-(phenyl dimethylurea)), and diamino-diphenylsulfone, (e.g. 4,4'-diaminodiphenylsulfone or 4,4'-DDS). One or more curing agents may be used and the total amount of curing agent(s) may be within the range of 2% to 20% by weight based on the total weight of the resin composition.

Inorganic fillers in particulate form (e.g. powder) may also be added to the peel ply resin composition as a rheology modifying component to control the flow of the resinous composition and to prevent agglomeration therein. Suitable inorganic fillers include, but are not limited to, fumed silica, talc, mica, calcium carbonate, alumina, ground or precipitated chalks, quartz powder, zinc oxide, calcium oxide, and titanium dioxide. If present, the amount of fillers in the peel ply resin compositions may be from 0.5% to 40% by weight, preferably 1-10% by weight, more preferably 1-5% by weight, based on the total weight of the resin composition.

The stoichiometry of peel ply resin composition may be adjusted so that the composition contains a deficiency in the amount of curing agent(s) that is necessary for reacting with 100% of the thermoset resin(s), and consequently, due to this deficiency, there will be unreacted or non-crosslinked functional groups from thermoset resin material at the end of a pre-determined curing cycle. After co-curing with the composite substrate, the thermoset resin material contains unreacted/non-crosslinked functional groups, which is the source of chemically-active functional groups for the modified, bondable surface disclosed herein.

Alternatively, the peel ply resin composition is formulated so that it cures at a slower rate than that of the composite substrate during co-curing. In one embodiment, the curing agents for the peel ply resin and the composite substrate's matrix resin are selected to allow for different cure rates. In another embodiment, one or more cure inhibitors is/are added to the peel ply resin to slow the rate of reaction between the thermoset resins and curing agents. Consequently, the composite substrate is fully cured after co-curing, but the peel ply resin is only partially cured.

In one embodiment, the resin composition of the peel ply contains, in weight percentages based on the total weight of the resin composition: 45%-55% phenol novolac epoxy resin; 5%-15% dicyclopentadiene-containing novolac epoxy resin, 20%-30% diglycidyl ether of bisphenol A; 15%-25% triglycidyl ether of aminophenol; 5%-15% $BF_3$ as curing agent, and 1%-5% inorganic filler.

The resin-containing peel ply may be formed by coating the resin composition onto the textile carrier so as to completely impregnate the textile using a conventional solution or hot-melt coating process, thereby forming a resin layer with the carrier embedded therein. The removable fabric is then pressed into the resulting resin layer. For hot-melt coating, the resin composition (without any solvent) is heated to form a molten material. For solution coating, one or more organic solvents may also be added to the resin composition, as necessary, to facilitate the mixing of the components. Examples of such solvents may include, but are not limited to, methyl ethyl ketone (MEK), acetone, dimethylacetamide, and N-methylpyrrolidone.

The wet peel ply is then allowed to dry, if solvent is used, to reduce the volatile content, preferably, to less than 2% by weight. Drying may be done by air drying at room temperature overnight followed by oven drying at 140° F. to 170° F. (or 60° C. to 77° C.), or by oven drying at elevated temperature as necessary to reduce the drying time. Subsequently, the dried peel ply may be protected by applying a removable release paper or synthetic film (e.g. polyester film) on opposite sides. Such release papers or synthetic films are to be removed prior to using the peel ply for surface bonding.

Composite Substrates

Composite substrates in this context refer to fiber-reinforced composites containing reinforcement fibers impregnated or infused with a resin composition, including prepregs or prepreg layups (such as those used for making aerospace composite structures). The term "prepreg" as used herein refers to a layer of fibrous material (e.g., unidirectional tows or tape, nonwoven mat, or fabric ply) that has been impregnated with a curable matrix resin. The matrix resin in the composite substrates may be in an uncured or partially cured state. The fiber reinforcement material may be in the form of a woven or nonwoven fabric ply, or unidirectional tape. "Unidirectional tape" refers to a layer of reinforcement fibers, which are aligned in the same direction. The term "prepreg layup" as used herein refers to a plurality of prepreg plies that have been laid up in a stacking arrangement.

According to one embodiment, a plurality of uncured prepreg plies may be laid up together with the curable, resin-containing peel ply as the outermost layer, followed by co-curing the layup. As examples, the number of prepreg plies may be 2-100 plies, or 10-50 plies.

The layup of prepreg plies may be done manually or by an automated process such as Automated Tape Laying (ATL). The prepreg plies within the layup may be positioned in a selected orientation with respect to one another. For example, prepreg layups may comprise prepreg plies having unidirectional fiber architectures, with the fibers oriented at a selected angle θ, e.g. 0°, 45°, or 90°, with respect to the largest dimension of the layup, such as the length. It should be further understood that, in certain embodiments, the prepregs may have any combination of fiber architectures, such as unidirectionally aligned fibers, multi-directional fibers, and woven fabrics.

Prepregs may be manufactured by impregnating a layer of continuous fibers or woven fabric with a matrix resin, creating a pliable and tacky sheet of material. This is often referred to as a prepregging process. The precise specification of the fibers, their orientation and the formulation of the resin matrix can be specified to achieve the optimum performance for the intended use of the prepregs. The volume of fibers per square meter can also be specified according to requirements.

The term "impregnate" refers to the introduction of a curable matrix resin material to reinforcement fibers so as to partially or fully encapsulate the fibers with the resin. The matrix resin for making prepregs may take the form of resin films or liquids. Moreover, the matrix resin is in a curable/uncured state prior to bonding. Impregnation may be facilitated by the application heat and/or pressure.

The reinforcement fibers in the composite substrates may take the form of chopped fibers, continuous fibers, filaments, tows, bundles, sheets, plies, and combinations thereof. Continuous fibers may further adopt any of unidirectional (aligned in one direction), multi-directional (aligned in different directions), non-woven, woven, knitted, stitched, wound, and braided configurations, as well as swirl mat, felt mat, and chopped mat structures. Woven fiber structures may comprise a plurality of woven tows, each tow composed of a plurality of filaments, e.g. thousands of filaments. In further embodiments, the tows may be held in position by cross-tow stitches, weft-insertion knitting stitches, or a small amount of resin binder, such as a thermoplastic resin.

The fiber materials include, but are not limited to, glass (including Electrical or E-glass), carbon, graphite, aramid, polyamide, high-modulus polyethylene (PE), polyester, poly-p-phenylene-benzoxazole (PBO), boron, quartz, basalt, ceramic, and combinations thereof.

Generally, the matrix resin of the composite substrates is similar to that of the peel ply. It contains one or more thermoset resins and a curing agent as the major components, in combination with additives such as catalysts, co-monomers, rheology control agents, tackifiers, rheology modifiers, inorganic or organic fillers, thermoplastic or elastomeric toughening agents, stabilizers, inhibitors, pigments/dyes, flame retardants, reactive diluents, and other additives well known to those skilled in the art for modifying the properties of the resin matrix before or after curing.

The thermoset resins that are suitable for the matrix resin of the composite substrates are those described above in reference to the peel ply resin composition. Suitable epoxy resins for the matrix resin of the composite substrates include polyglycidyl derivatives of aromatic diamine, aromatic mono primary amines, aminophenols, polyhydric phenols, polyhydric alcohols, polycarboxylic acids. Examples of suitable epoxy resins include polyglycidyl ethers of the bisphenols such as bisphenol A, bisphenol F, bisphenol S and bisphenol K; and polyglycidyl ethers of cresol- and phenol-based novolac epoxy resins.

The curing agent for thermoset resins is selected from known curing agents, for example, guanidines (including substituted guanidines), ureas (including substituted ureas), melamine resins, guanamine derivatives, amines (including primary and secondary amines, aliphatic and aromatic amines), amides, anhydrides (including polycarboxylic anhydrides), and mixtures thereof.

The toughening agents may include thermoplastic and elastomeric polymers, and polymeric particles such as core-shell rubber particles, polyimide particles, polyamide particles, etc.

Inorganic fillers may include fumed silica quartz powder, alumina, platy fillers such as mica, talc or clay (e.g., kaolin).

Adhesive

The adhesive for bonding composite substrates is a curable composition suitable for co-curing with the uncured or curable composite substrates. The curable adhesive composition may comprise one or more thermoset resins, curing agent(s) and/or catalyst(s), and optionally, toughening agents, filler materials, flow control agents, dyes, etc. The thermoset resins include, but are not limited to, epoxy, unsaturated polyester resin, bismaleimide, polyimide, cyanate ester, phenolic, etc.

The epoxy resins that may be used for the curable adhesive composition include multifunctional epoxy resins having a plurality of epoxy groups per molecule, such as those disclosed for the matrix resin of the peel ply and composite substrate.

The curing agents may include, for example, guanidines (including substituted guanidines), ureas (including substituted ureas), melamine resins, guanamine derivatives, amines (including primary and secondary amines, aliphatic and aromatic amines), amides, anhydrides, and mixtures thereof. Suitable curing agents include latent amine-based curing agents, which can be activated at a temperature greater than 160° F. (71° C.), preferably greater than 200° F., e.g. 350° F. Examples of suitable latent amine-based curing agents include dicyandiamide (DICY), guanamine, guanidine, aminoguanidine, and derivatives thereof. A particularly suitable latent amine-based curing agent is dicyandiamide (DICY).

A curing accelerator may be used in conjunction with the latent amine-based curing agent to promote the curing reaction between the epoxy resins and the amine-based curing agent. Suitable curing accelerators may include alkyl and aryl substituted ureas (including aromatic or alicyclic dimethyl urea); bisureas based on toluenediamine or methylene dianiline. An example of bisurea is 2,4-toluene bis (dimethyl urea). As an example, dicyandiamide may be used in combination with a substituted bisurea as a curing accelerator.

Toughening agents may include thermoplastic or elastomeric polymers, and polymeric particles such as core-shell rubber particles. Suitable thermoplastic polymers include polyarylsulphones with or without reactive functional groups. An example of polyarylsulphone with functional groups include, e.g. polyethersulfone-polyetherethersulfone (PES-PEES) copolymer with terminal amine functional groups. Suitable elastomeric polymers include carboxyl-terminated butadiene nitrile polymer (CTBN) and amine-terminated butadiene acrylonitrile (ATBN) elastomer.

Inorganic fillers may be in particulate form, e.g. powder, flakes, and may include fumed silica quartz powder, alumina, mica, talc and clay (e.g., kaolin).

In one embodiment the adhesive is an epoxy-based composition curable at temperatures above 200° F. (93° C.), e.g. 350° F. (176.7° C.).

The surface preparation using the resin-containing peel ply as disclosed herein provides additional strength and toughness to a bonded structure, and is particularly suitable for improving fracture toughness at low temperatures, e.g., below 75° F. (or below 24° C.). Another advantage of such surface preparation method is that it can promote strong and longer lasting bonding between the composite substrates.

Example

A curable peel ply resin composition was prepared based on the formulation shown in Table 1. The amounts are in parts by weight.

TABLE 1

| Components | Amounts (Parts) |
| --- | --- |
| Phenol novolac epoxy resin | 50 |
| Diglycidyl ether of Bisphenol A | 25 |
| Triglycidyl ether of aminophenol | 20 |
| Dicyclopentadiene-based novolac epoxy resin | 10 |
| 4,4'-aminodiphenylsulfone (4,4'-DDS) | 11.3 |
| Fumed Silica | 2 |

Using a hot-melt process, the resin composition was coated onto a polyester knit fabric with 10 gsm areal weight and 147 µm thickness ("knit carrier") to form a resin layer with an embedded knit fabric. The knit fabric has the tricot knit pattern shown in FIG. 4. Following coating, a woven polyester fabric with areal weight of 100 gsm and 147 µm thickness from DIATEX ("removable peel ply fabric") was pressed into the same resin layer under vacuum. The resulting resin-impregnated fabric layer was then used as a peel ply for surface preparation.

For comparison, a second peel ply was formed in the same manner except only the removable peel ply fabric was embedded in the resin layer, no knit carrier was used.

Each of the prepared peel ply materials was manually laid up with 10 plies of CYCOM 977-2 prepreg material to form a laminate with the peel ply as the outer layer. CYCOM 977-2 (available from Cytec Engineered Materials) is a prepreg material containing unidirectional carbon fibers impregnated with epoxy-based resin. The uncured laminate was cured by heating at 350° F. (176.7° C.) for 2 hours at 80 psi (0.55 MPa).

After curing, the peel ply (the polyester fabric together with some cured resin) on each cured laminate was removed by hand to yield a cured composite panel with a bondable surface. For the peel ply containing the knit carrier, the knit carrier and part of the peel ply resin remained on the cured composite panel.

The cured composite panel with the modified surface was then bonded via secondary bonding to another identical composite panel using an epoxy-based adhesive FM 309-1 (available from Cytec Engineered Materials Inc.). The curing of the bonded panels was carried out by heating at 350° F. for two hours at 40 psi (0.28 MPa).

The mechanical performance of the bonded articles was determined by measuring $G_{1c}$ fracture toughness according to ASTM D5528. The results are shown in Table 2.

TABLE 2

| Peel Ply | $G_{1c}$ (in-lb/in$^2$) @ –67° F. (–55° C.) |
| --- | --- |
| Control (no carrier) | 3.2 (560 J/m$^2$) |
| Peel Ply with carrier | 5.9 (1032 J/m$^2$) |

Figure 5:
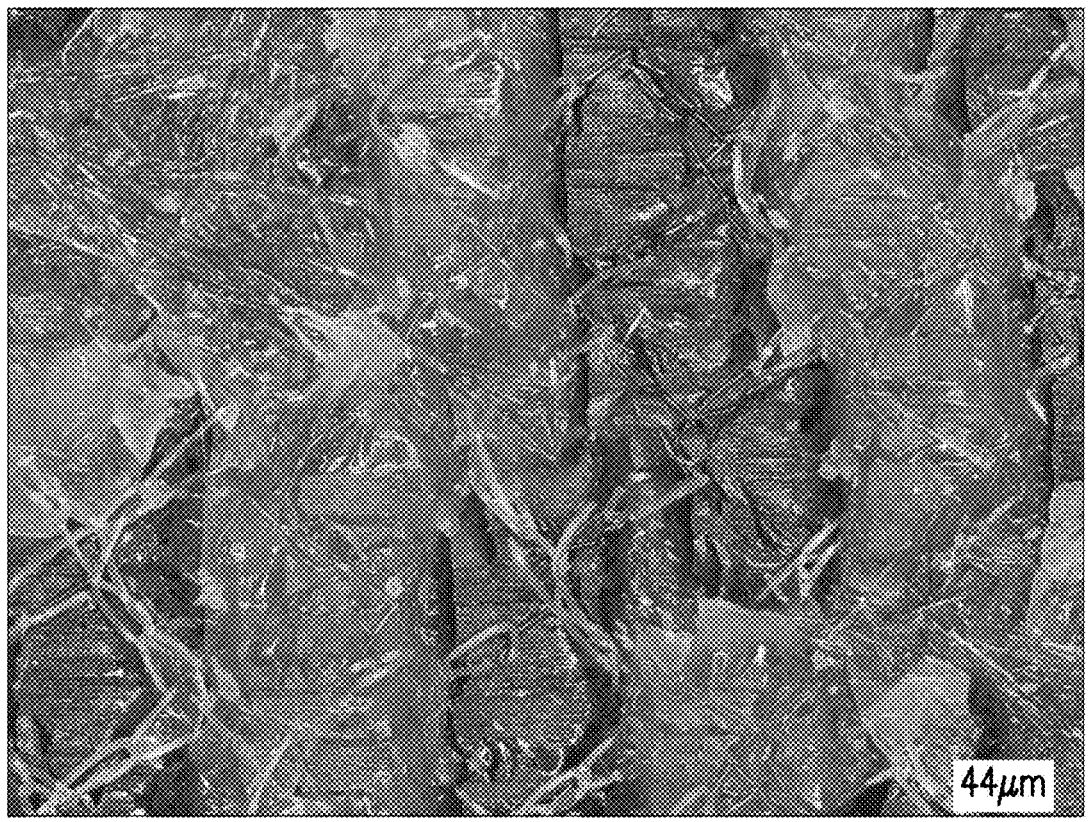
FIG. 5 shows a fractured surface under magnification following $G_{1c}$ fracture toughness testing.

FIG. 5 shows a fractured surface under magnification following $G_1$ fracture toughness testing, and illustrates how the knit carrier became involved in the cohesive failure. Broken fiber loops in the knit carrier provided added strength to the composite joint resulting in increased $G_{1c}$ performance.

Terminology

The modifier "approximately" or 'about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, 5 wt % to 20 wt %", is inclusive of the endpoints and all intermediate values of the ranges.

What is claimed is:

1. A method for surface preparation of a composite substrate comprising:
    (a) providing a composite substrate comprising reinforcing fibers impregnated with a curable matrix resin;
    (b) providing a resin-containing peel ply comprising a curable resin layer in which a non-removable textile carrier and a removable woven fabric are embedded;
    (c) placing the resin-containing peel ply into contact with a surface of the composite substrate;
    (d) co-curing the peel ply and the composite substrate; and
    (e) removing the peel ply from the surface of the composite substrate such that the removable woven fabric is removed together with some peel ply's resin but the non-removable textile carrier and a film of residual resin remain on the composite substrate, thereby creating a modified surface on the composite substrate, wherein the textile carrier is in the form a woven fabric, a knitted fabric or a nonwoven veil.

2. The method according to claim 1, wherein the non-removable textile carrier and the removable woven fabric comprise fibers or yarns that are made of a material selected from: polyesters, polyethylene, polypropylene, polyamide (nylon), elastomeric materials, polyaramids, polyimides, polyethyleneimine (PEI), polyoxazole, polybenzimidazole (PBI), polyether ether ketone (PEEK), glass, and combinations thereof.

3. The method of claim 1, wherein the non-removable textile carrier is a knitted fabric with open mesh knit pattern.

4. The method according to claim 3, wherein the knitted fabric comprises knitted polyester yarns.

5. The method according to claim 1, wherein the non-removable textile carrier has an areal weight in the range of 5 gsm to 100 gsm.

6. The method according to claim 1, wherein the non-removable textile carrier has a thickness in the range of 10 µm to 250 µm.

7. The method according to claim 1, wherein the removable woven fabric has an areal weight within the range of 50 gsm to 250 gsm.

8. The method according to claim 1, wherein the removable woven fabric has a thickness within the range of 50 µm to 250 µm.

9. The method according to claim 1, wherein the curable resin layer of the peel ply is formed from a composition comprising:
- at least one epoxidized novolac resin having epoxy functionality of at least 2;
- di-functional epoxy resin selected from diglycidyl ethers of polyhydric phenols;
- tri-functional epoxy resin selected from triglycidyl ethers of aminophenols;
- a curing agent; and
- inorganic filler particles, wherein the resin-containing peel ply has a resin content of at least 20% by weight based on the total weight of the peel ply.

10. The method according to claim 1, wherein the composite substrate is fully cured following co-curing, but the peel ply's resin layer is only partially cured.

11. A bonding method comprising:
(i) providing a first composite substrate comprising reinforcing fibers impregnated with a curable matrix resin;
(ii) forming a modified surface on the first composite substrate using the method for surface preparation of claim 1;
(iii) joining the first composite substrate with the modified surface to a second composite substrate with a curable adhesive film in between the composite substrates, said adhesive film being in contact with the modified surface of the first composite substrate; and
(iv) curing the joined composite substrates.

12. The bonding method of claim 11, wherein the adhesive film comprises one or more epoxy resins and a curing agent.

13. The bonding method of claim 11, wherein the second composite substrate is cured prior to being joined to the cured, first composite substrate.

14. The bonding method of claim 11, wherein the second composite substrate is uncured or partially cured prior to being joined to the first composite substrate, and during curing at (iv), the adhesive film and the second composite substrate are cured simultaneously.

* * * * *